March 10, 1959

W. P. HERMAN ET AL 2,876,452

AUTOMATIC ASSEMBLY APPARATUS

Filed Oct. 27, 1954

INVENTORS
WILLIAM P. HERMAN
THOMAS KENNETH HOBSON
BY

*Max Schwartz*

ATTORNEY

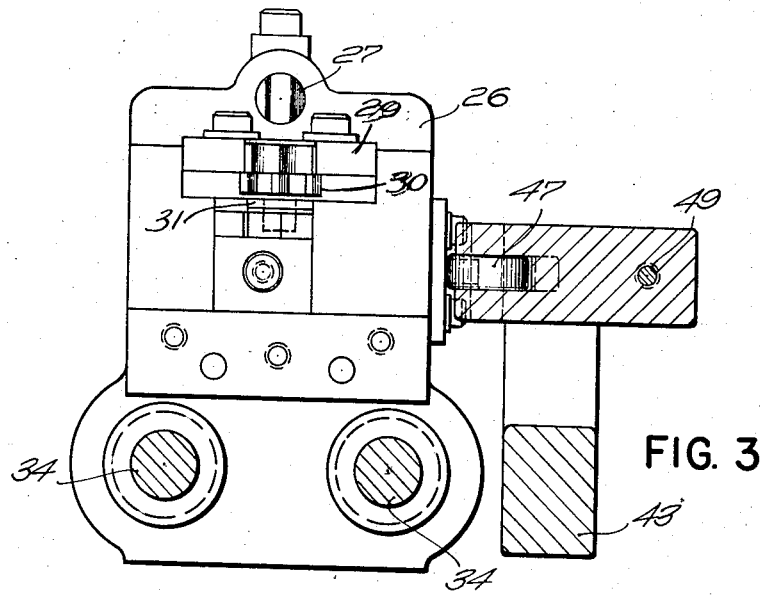
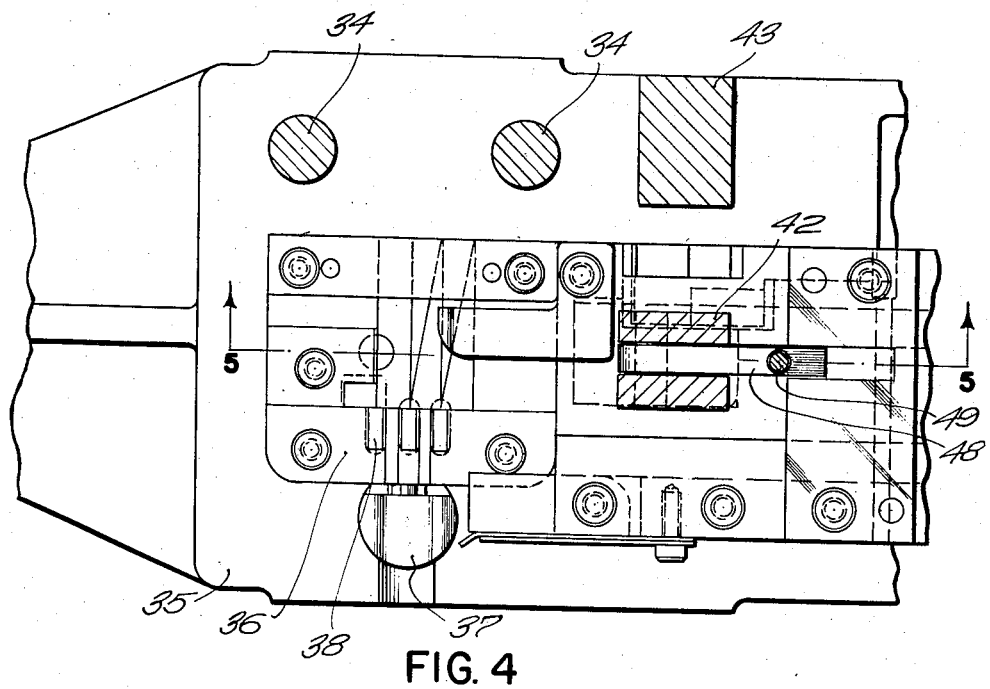

March 10, 1959     W. P. HERMAN ET AL     2,876,452
AUTOMATIC ASSEMBLY APPARATUS
Filed Oct. 27, 1954                                             4 Sheets-Sheet 3

INVENTORS
WILLIAM P. HERMAN
THOMAS KENNETH HOBSON
BY
Max Schwartz
ATTORNEY

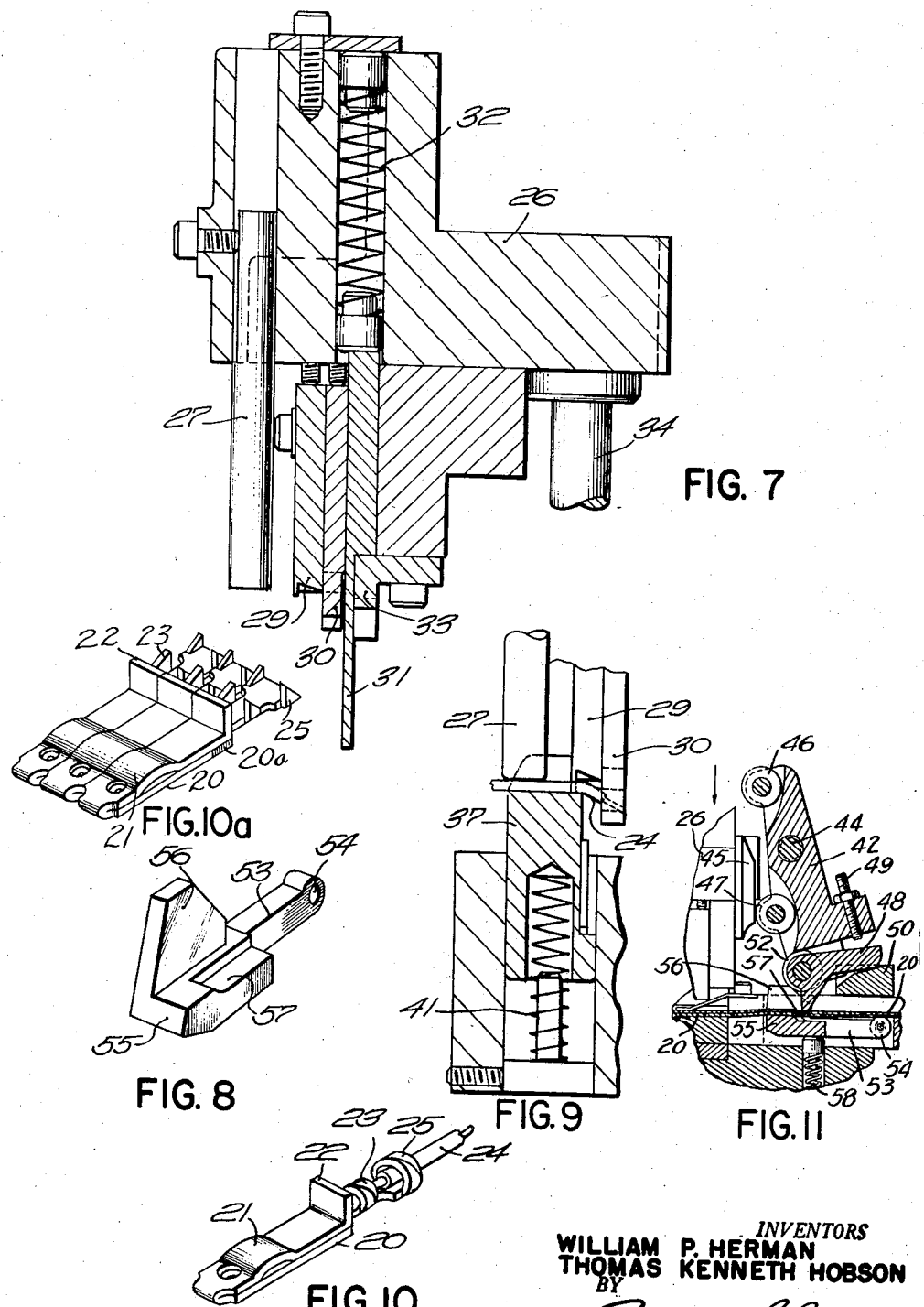

2,876,452
AUTOMATIC ASSEMBLY APPARATUS

William P. Herman, Providence, and Thomas Kenneth Hobson, Central Falls, R. I., assignors to Electrix Corporation, Ashton, R. I., a corporation of Rhode Island Application October 27, 1954, Serial No. 465,112

4 Claims. (Cl. 1—177)

Our present invention relates to assembly machines and more particularly to an automatic apparatus for assembling electrical contact blades and cord lead wires.

The principal object of the present invention is to provide an automatic assembly machine for connecting electrical cord lead wires to a continuous strip of contact blades automatically fed into the machine.

A further object of the present invention is to provide an automatic assembly machine for handling spring type blades in strip form.

Another object of the present invention is to provide an assembly machine having a novel type of feed mechanism which is positive in its action and which will feed the spring blades without flattening.

A further object of the present invention is to provide an assembly machine in which the parts are easy to assemble and adjust.

Another object of the present invention is to provide an assembly machine for assembling cord lead wires and electrical contact blades which is simple in operation and materially increases the rate of production.

With the above and other objects and advantageous features in view, our invention consists of a novel arrangement of parts, more fully disclosed in the detailed description following, in conjunction with the accompanying drawings, and more particularly defined in the appended claims.

In the drawings:

Fig. 3 is a section taken on line 3—3 on Fig. 1.

Fig. 4 is a section taken on line 4—4 on Fig. 1.

Fig. 5 is a section taken on line 5—5 on Fig. 4.

Fig. 6 is a section taken on line 6—6 on Fig. 5.

Fig. 7 is a section taken on line 7—7 on Fig. 5.

Fig. 8 is a perspective view of the yielding support.

Fig. 9 is a fragmentary sectional view showing the action of the die on the cord lead wire.

Fig. 10 is a perspective view of a completed assembly.

Fig. 10a is a perspective view of a plurality of blades in strip form prior to assembly.

Fig. 11 is a fragmentary section showing the feed lever of Fig. 5 in withdrawn position.

Figure 1:
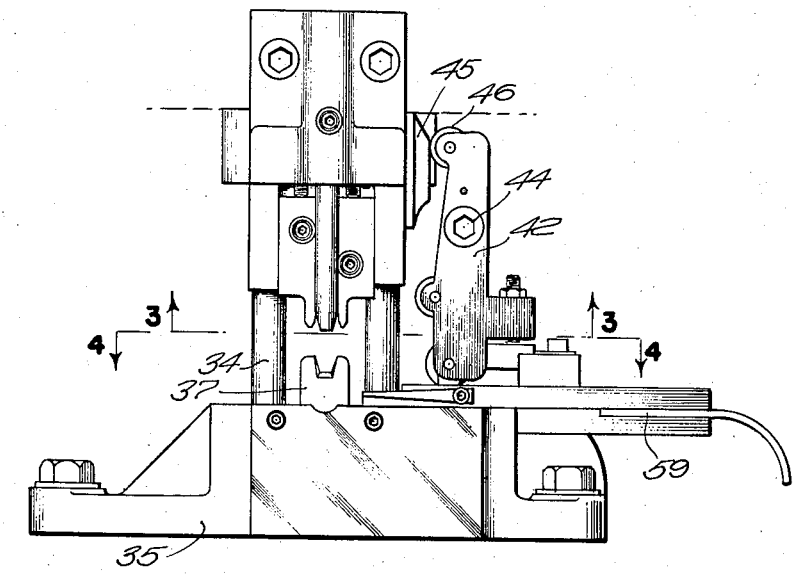
Fig. 1 is a front elevation of a machine embodying our invention.

It has been found that the assembly of contact blades with electrical cord lead wires can be greatly facilitated by eliminating the soldering by crimping the wire to the blade. This permits the blades to be manufactured in continuous strip form and fed into a crimping press. The usual procedure is for the operator to place the bared ends of a pair of cord lead wires in position under the press and the stroke of the press crimps each wire to a blade and severs the blades from the strip. The strip is then automatically advanced so that a second pair of blades are in position for assembly. This type of assembly requires accurate feeding of the strip of blades in aligned position beneath the assembly tools. Most blades are of the spring type with an arcuate folded contact portion. The conventional type of press feed has a tendency to flatten the spring. The present invention is designed to provide a crimping press which feeds the strips of blades with great accuracy without flattening the blade and which produces a suitable crimped connection between the blade and cord lead wire. The apparatus of the present invention is designed to make the type of crimped connection shown in Fig. 10. The electrical contact blade 20 is folded over at the contact end to form the arcuate spring blade portion 21. The free end of the folded portion is bent upwardly as at 22. The body portion of the blade is provided with intermediate tangs 23 which are crimped over the bare end of the cord lead wire 24. The rear end of the blade is provided with lugs 25 which are crimped over the insulated portion of the wire 24 for strain relief. The end of the bare wire rests against the upturned end 22 of the spring portion of the blade. The blade 20 is made in a continuous strip as shown in Fig. 10a with a small uncut portion 20a along the side edge holding the blades together. The apparatus of the present invention feeds the strip of blades to the die and the die provides the crimped connections 23 and 25 and severs the blade from the strip.

The apparatus of the present invention is designed to be mounted in a conventional power press (not shown) in which there is a fixed lower die bed and a vertically reciprocating ram. The device comprises a generally L-shaped upper die block 26 which is normally mounted on the press ram. The various tools are mounted in the block 26 in such manner that they can be readily replaced or adjusted. Referring to Fig. 7 an adjustable post 27 is mounted in the forward portion for holding the cord lead wire in proper position. The various punches are so mounted that they can be readily replaced by removing the bolts 28 at the front of the tool. The forward punch 29 is the crimp punch for crimping the insulated portion of the wire at 25. The next punch is a crimp punch 30 which crimps the bare portion of the wire as at 23. Behind the punch 30 is a wire stop member 31 which extends downwardly below the various punches. This member acts as a positioning stop for the operator. When the operator inserts the cord lead wires he pushes into the machine until they contact the stop member 31. The member 31 is held in down position by a light spring 32 so that it will ride upwardly out of the way during the assembly. The shearing blade 33 is mounted just behind the stop member 31. The upper die block rides on a pair of positioning posts 34 at the rear of the dies.

The lower die block 35 is mounted on the bed of the press. It comprises a die block 36 having an upstanding sleeve 37 for holding the wire in proper position over the lower crimping dies 38 shown in Fig. 4. Referring to Fig. 5 the lower die block is provided with a plurality of shearing edges 39 which cooperate with the blade shearer 33 to sever the blades from the strip. A spring pressed pin 40 extends upwardly from the die bed 36 for releasing the assembled blades from the press.

It is essential that the crimped connection 23 hold all the strands of the cord lead wire uniformly and that the crimping be clean without a loose strand of wire. The requirement is that the entire connection be able to withstand a 20 pound pull test. In order to ensure accuracy the wire must properly butt the base of the spring plate portion 22. Referring to Fig. 9, the tool is designed so that when the wire is placed on the holder 37 the crimping punch 29 engages the forward end and bends it downwardly at an angle. The wire is then pinned by the post 27. The holder 37 is mounted on a spring 41 and rides downwardly with the punches.

The wire 24 is thus engaged and bent above the level of the lower die and carried downwardly into the blade 20. The forward inclined tip of the wire will thus be pushed into position against the blade portion 22 just prior to the crimping operation to confine the wire within the crimped portion 23.

Figure 2:
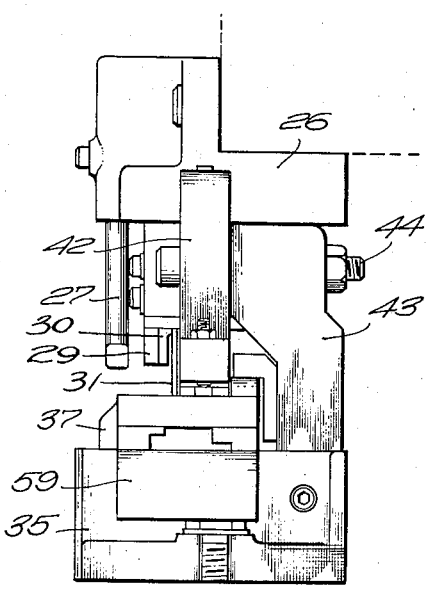
Fig. 2 is a side elevation thereof.

The feed mechanism is shown in detail in Figs. 1, 2, 5, 6 and 11. Referring to Figs. 1, 2 and 5 a feed lever 42 is vertically pivotally mounted on a support 43, a pivot element 44 being slightly above center. A cam block 45 having upper and lower cam edges is mounted on the side of the upper die block 26. The feed lever 42 is provided with a roller 46 at its upper inner edge which extends in the path of vertical movement of the cam 45. The body portion of the lever 42, below the level of the pivot 44 is provided with a second roller 47 also in the path of movement of the cam 45. When the upper die element is raised it will contact the roller 46 as shown in Fig. 5 and pivot the lever 42 so that its lower end moves toward the dies (to the left in Fig. 5). When the upper die element moves downwardly the cam 45 contacts the roller 47 as shown in Fig. 11 and pivots the lever 42 away from the dies.

Pivotally mounted on the lower end of the lever 42 is an L-shaped feed finger 48. The long arm of the finger 48 lies horizontally beneath the lever 42 and is adjustably held in position by the screw 49 on the feed stroke of the lever. The short arm of the finger 48 is tapered and extends downwardly in the path of movement of the contact blades 20. A guide block 50 is positioned behind the finger 48 and is provided with a slot 51 having an inclined bottom. When the lever 42 is pivoted rearwardly the horizontal arm of the finger 48 is guided in the slot 51 and is kept in raised position by the inclined bottom of the slot. A roller 52 is mounted on the inside end of the feed finger pivot as shown in Fig. 6.

The contact blades 20 are positioned transversely of their movement and it is necessary that the feed finger 48 engage the edge of every second blade and move the strip toward the dies two blades at a time. It is essential that the feed finger be low enough to positively engage the blades. To ensure a positive engagement, the feed finger pivot is positioned slightly to the left of a vertical line through the lever pivot 44 as shown in Fig. 5. Thus on the feed stroke the feed finger will be swinging slightly downwardly towards the blades when it makes contact. It is also necessary that the edge of the blade to be contacted be slightly raised and yet room must be left for the feed finger to swing with the lever without flattening the spring elements on the blades.

To accomplish the above we position a yielding support in the path of movement of the blades as shown in Figs. 5, 6, 8 and 11. The support comprises an arm 53 pivotally mounted at its outer end 54 and having an integral head 55 which comprises an upstanding cam edge 56 at the rear edge of the head and a lower cut out portion 57 toward the front edge of the head as shown in Fig. 8. The support is pivotally mounted in the lower die block 35 so that the head 55 rests on a coil spring 58 which tends to move the head upwardly with considerable pressure. The cam edge 56 is in the path of swinging movement of the roller 52 in back of the lever 42 as shown in Fig. 6. The strip of blades 20 are fed along the chute 59 and over the cut out portion 57 in the head 55. When the upper die element moves downwardly the cam 45 engages the roller 47 and pivots the lever 42 to the right as shown in Fig. 11. The short arm of the finger 48 will ride over the spring portion 21 of the blades which are over the cut out 57 and are therefore unsupported at this point. The blades will therefore yield sufficiently to prevent their being flattened. At this point the roller 52 will be free of the cam 56 and the spring 58 will force the head 55 upwardly. Those blades which have passed the cut out portion 57 and are now resting on the raised portion of the head 55 will be bent slightly upwardly. When the die moves upwardly the cam 45 will engage the roller 46 and the finger 48 will swing to the left and engage the upwardly raised edge of these blades. At the same time the roller 52 will engage the cam 56 and push the head 55 downwardly against the action of the spring 58 releasing all pressure from the blade strip and allowing the finger to move it freely into the die into the position shown in Fig. 5.

Thus sufficient allowance is provided at all times for the pivotal movement of the feed finger to prevent flattening of the blades. At the same time the blade to be contacted by the finger is bent slightly upwardly to ensure a positive feed without skipping. Between the feed finger and the die a spring tongue 60 rests on the strip of blades and engages the edge of the second blade in the die. This prevents a backlash when the blades are fed to their positioning stop.

The operation of the device is thus simple. Figs. 1 to 9 inclusive show the press in its up stroke position, two blades at the end of the strip having been fed beneath the dies. A pair of electrical cords with the ends bare are then positioned on the holder 37 with the bare end of each cord extending substantially directly over the back end of the blade. This position is automatically obtained when the operator inserts the cords so that the bare ends touch the stop member 31 shown in Fig. 7. As the upper die element moves downwardly the post 27 engages the wire and moves the holder 37 downwardly against the action of the spring 41 as shown in Fig. 9. As this downward movement takes place it will be noted that the crimp punch 29 will tend to bend the end of the wires downwardly and keep them within the radii of the punch 30, see Fig. 3. Simultaneously, towards the lower end of the stroke the cam 45 will engage the roller 47 and rock the feed lever 42 to the right as shown in Fig. 11. As the feed finger 48 moves to the right the blades directly underneath yield slightly into the space 57 in the head 55. Further downward movement results in the simultaneous crimping of a pair of blades by the punches 29 and 30 and the severing of the blades by the cutter 33 at the point 20a. Meanwhile, the lever 42 has reached its backmost position and the lever 48, riding on the angle 51 releases the tension on the blades. The head 55 is forced upwardly by the spring 58 against the strip of blades so that the blades forward of the depression are raised by the high point of the head. As the press moves upwardly into the position shown in Fig. 1, the cam 45 engages the roller 46 and begins a pivotal movement of the lever 42 in the opposite direction. The roller 52 engages the cam edge 56 and moves the head 55 downwardly against the action of the spring 58. Simultaneously the tip end of the feed finger 48 catches the edge of the upturned blade and advances two blades to crimping position. The cycle is completed when the new blades reach crimping position, the upward movement of the post 27 and sleeve 37 having released the wires with the blades attached.

We have thus provided an assembly apparatus for handling strips of contact blades without crushing or flattening the blades and which ensures a perfect assembly between the blades and their cord lead connections. Other advantages of the present invention will be readily apparent to a person skilled in the art.

We claim:

1. In a contact blade and cord assembly machine, a lower die element and an upper reciprocating die element, means for feeding a continuous strip of contact blades in position between said die elements, said feeding means being actuated by the reciprocating movement of said upper die element, a yielding support for said blades beneath said feeding means to permit movement of said feeding means without crushing said blades, and cam means for depressing said support during the feeding movement of said feeding means, said support having means for raising every other blade above the plane of said strip to provide a raised edge for engaging said feeding means.

2. In a contact blade and cord assembly machine, a lower die element and an upper reciprocating die element, means for feeding a continuous strip of contact blades in position between said die elements, said feeding means including a reciprocating lever arm extending downwardly in contact with said strip, said feeding means being actuated by the reciprocating movement of said upper die element, and a yielding support for said blades beneath said lever arm to permit movement of said lever arm without crushing said blades, said support having a cam edge engageable by said feeding means to depress said support during the movement of said lever arm.

3. In a contact blade and cord assembly machine, a lower die element and an upper reciprocating die element, means for feeding a continuous strip of contact blades in position between said die elements, said feeding means being actuated by the reciprocating movement of said upper die element, said feeding means including a reciprocating lever arm extending downwardly in contact with said strip, and a yielding support for said blades beneath said lever arm to permit movement of said lever arm without crushing said blades, said support having means for raising every other blade above the plane of said strip to provide a raised edge for engaging said lever arm, said support having a cam edge engageable by said feeding means to depress said support during the movement of said lever arm.

4. In a contact blade and cord assembly machine, a lower die element and an upper reciprocating die element, means for feeding a continuous strip of contact blades in position between said die elements, said feeding means including a reciprocating lever arm extending downwardly in contact with said strip, said feeding means being actuated by the reciprocating movement of said upper die element, and a yielding support for said blades beneath said lever arm to permit movement of said lever arm without crushing said blades, said support having means for raising every other blade above the plane of said strip to provide a raised edge for engaging said lever arm, said support having a cam edge engageable by said feeding means to depress said support during the movement of said lever arm, and a spring finger engaging said blades to prevent reverse movement thereof after the feeding operation.

References Cited in the file of this patent
UNITED STATES PATENTS

| | | |
|---|---|---|
| 1,873,125 | Holmes et al. | Aug. 23, 1932 |
| 2,256,796 | Soave | Sept. 23, 1941 |
| 2,438,023 | Sirp | Mar. 16, 1948 |
| 2,592,276 | Hackbarth | Apr. 8, 1952 |
| 2,631,213 | Martines | Mar. 10, 1953 |
| 2,688,133 | Berg | Sept. 7, 1954 |
| 2,727,236 | Klumpp, Jr. | Dec. 20, 1955 |
| 2,760,195 | Berg | Aug. 28, 1956 |